Patented Apr. 12, 1949

2,466,897

UNITED STATES PATENT OFFICE 2,466,897

PTERIDINE COMPOUNDS AND METHOD OF PREPARING SAME

Martin E. Hultquist, Bound Brook, N. J., assignor to American Cyanamid Company, New York, N. Y., a corporation of Maine No Drawing. Application January 15, 1946, Serial No. 641,404

12 Claims. (Cl. 260—251)

This invention relates to new N-(aromatic[b]-pyrazylmethyl) compounds and to methods of preparing the same.

The new compounds of the present invention have the following general formula:

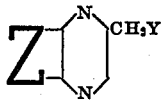

in which Y is the radical of a tertiary amine or quaternary ammonium compound. Such radicals have the formulae —NRR' and —NRR'R"X in which R, R' and R" may be aliphatic or aromatic radicals or may together represent the residue of a saturated or unsaturated ring structure with the nitrogen atom included as in the case of piperidine or pyridine. The monovalent anion represented by X is preferably one of the halogens, but may also be —OH, —HSO₃, or other known anion capable of salt formation with the cation of a quaternary base. In the formula Z represents an aromatic ring which may be a carbocyclic ring, such as benzene, or a heterocyclic ring, such as pyridine, pyrimidine, pyrazine and the like. The aromatic ring may be substituted with a variety of radicals, such as alkyl, amino, hydroxy, and others such as will be specifically named hereinafter.

The new compounds are prepared by reacting together an aromatic vicinal diamine; that is, an aromatic compound having at least two amino groups on adjacent carbon atoms, with a compound having the formula:

$$\text{Hal—CH CH}_2\text{Y}$$
$$\text{O=CH}$$

in which Hal represents a halogen and Y is as defined above.

The reaction which takes place to form the new compounds is a complex one. For purposes of illustration, it may be represented by the following equation:

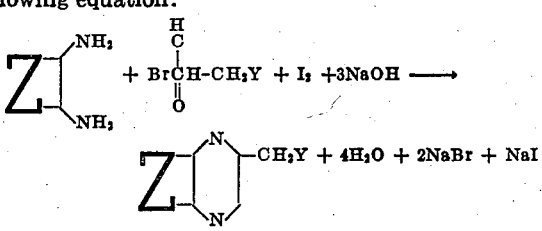

As will be noted, the illustrated reaction shows the use of iodine. The use of iodine in the reaction has been found helpful in increasing the yields and in giving a less soluble, more readily crystallizable product, but it is not of paramount importance because the reaction will proceed to give a N-(aromatic [b]pyrazinylmethyl compound in its absence. It appears probable that a dihydro form of the pyrazine ring is an intermediate in the reaction and the use of a mild oxidizing agent, such as iodine, is desirable to convert this intermediate to the more stable, aromatic pyrazine ring. In the absence of iodine this conversion takes place anyway, either through some internal oxidation-reduction reaction or through oxidation with atmospheric oxygen, or both. As the yields of desired product are higher when using iodine, I prefer to use this or some other mild oxidizing agent. It is to be noted, however, that the use of iodine and other oxidizing agents in reactions of this type is the invention of Donna B. Cosulich, such processes being described and claimed in her copending application Serial Number 689,821, filed August 10, 1946, now abandoned.

The illustrated reaction shows the use of a compound having a bromine atom attached to the carbon atom adjacent the carbonyl group, but it will be understood that other halogens may be substituted therefor. The use of the chlorine derivative may be advantageous in some cases because of its lower cost.

Although the process of the present invention appears to be applicable to the use of any carbocyclic or heterocyclic vicinal diamine, the process is of particular importance in the preparation of 6-substituted-pyrimido[4,5-b]pyrazines. As will appear obvious upon inspection of the formula of pyrimido[4,5-b]pyrazine, substituents may be placed on either the 6 or 7 position. Ordinarily, there is no way of controlling the substitution and as the result the final product is a mixture of isomers, substituted in both the 6 and 7 position. For some purposes only the 6 substituted pyrimido[4,5-b]pyrazine is of value, the 7 substituted isomer being an impurity which lowers the yield and quality of the desired product. It is one of the advantages of the present process that practically all of the substitution occurs in the 6 position, as illustrated in the general formula given above.

The new compounds are valuable as intermediates in the preparation of other organic compounds, particularly the biologically active substances known as folic acid and antagonists of folic acid. Those in which Y is the quaternary ammonium radical —NRR'R"X are strongly cationic and are useful as surface acting agents and germicides, fungicides, or insecticides, depending upon the nature of the substituent groups.

Among the various aromatic vicinal diamines that may be employed in the reaction there may be specifically mentioned the following: 4,5-diaminopyrimidine, 2-methyl-4,5-diamino-6-hydroxypyrimidine, 2-undecyl-4,5-diamino-6-hydroxypyrimidine, 2,4,5-triamino-6-hydroxypyrimidine, and others of similar character.

The halogenated aldehydes which are used as intermediates may be prepared by reacting a 2,3-dihalopropionaldehyde with a secondary or tertiary amine. When secondary amines are used the symbol Y is found to be —NRR' whereas the use of tertiary amines results in the production of intermediates having the group —NRR'R''X. Suitable secondary amines include diethylamine, diisopropyl amine, dioctyl amine, morpholine, piperidine, methylaniline and other aliphatic and aromatic secondary amines in which R and R' may represent the same or different radicals which may or may not be united in a ring structure. Tertiary amines that may be used include pyridine, the preferred species, and others such as trimethylamine, dimethylaniline, quinoline, and the like. Preparation of representative compounds of this type is illustrated in the specific examples which follow.

*Example 1*

To a solution of 64.8 g. (0.3 mole) 2,3-dibromopropionaldehyde in 200 cc. anhydrous ether was added 27 g. (0.3 mole) anhydrous pyridine, keeping the temperature of the reaction at 0° C. to 5° C. The slightly yellowish slurry was allowed to stand one hour at 0° to 10° C., then 100 cc. water was added to dissolve the product, and the ether layer was discarded.

The aqueous layer was added to a solution of 70 g. (0.33 mole) 2,4,5-triamino-6-hydroxypyrimidine dihydrochloride in 600 cc. water. To this brown solution was added 5N-sodium hydroxide as necessary to keep the solution at about pH 4.0-5.0, while cooling in an ice bath to keep the temperature below 40° C.

After no more sodium hydroxide was required to maintain the pH at 4.0 to 5.0, there was added a solution of 25 g. iodine in 150 cc. water and 50 g. potassium iodide, which was enough to give a blue-black spot on starch-iodide test paper. The N-[(2-amino-4-hydroxy-6-pyrimido[4,5-b]pyrazyl)methyl]pyridinium iodide began to crystallize out and was filtered off after cooling. The product was believed to have the structural formula

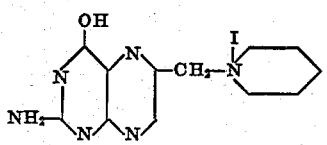

After recrystallization by dissolving in 500 cc. hot water and 25 cc. 5-N-hydrochloric acid, adding 5 mg. activated charcoal, clarifying and adding 50 g. potassium iodide, the golden yellow crystals were filtered from the cooled solution, washed with water and dried. The product, on analysis for iodine and nitrogen, was found to check closely with the theoretical values.

Oxidation of the product with alkaline permanganate solution gave a good yield of 2-amino-4-hydroxy-6-carboxypyrimido[4,5-b]pyrazine having a purity of better than 95%. None of the isomeric 7-carboxy compounds could be detected, thus indicating that practically all of the substitution took place on the 6 position in the reaction above.

*Example 2*

To a solution of 21.6 g. (0.1 mole) 2,3-dibromopropionaldehyde in 100 cc. anhydrous ether was added 9 g. (0.1 mole) anhydrous pyridine with cooling as necessary to keep the temperature at 0° to 5° C. After 1 hour at 5° to 10° C., there was added 30 cc. water to dissolve the product, and the ether layer was discarded.

The aqueous solution was added to a solution of 21.4 g. (0.1 mole) 2,4,5-triamino-6-hydroxypyrimidine dihydrochloride in 200 cc. water with the pH adjusted to about 4.0, and there was added 30 g. potassium iodide.

The resulting solution on standing overnight gave crystalline N-[(2-amino-4-hydroxy-6-pyrimido[4,5-b]pyrazyl)methyl]pyridinium iodide.

This compound was first prepared and isolated as the bromide salt. It was later found, however, that the iodide is more insoluble, especially in the presence of an excess of iodine. Isolation of the salt, as the iodide, is therefore a preferred procedure.

*Example 3*

In Example 1, if 2,3-dichloropropionaldehyde is used instead of 2,3-dibromopropionaldehyde, there is obtained 20.8% of theory of N-[(2-amino-4-hydroxy-6-pyrimido[4,5-b]pyrazyl)methyl]pyridinium iodide.

*Example 4*

To a solution of 15 gm. (0.07 mole) 2,4,5-triamino-6-hydroxypyrimidine dihydrochloride in 200 cc. water was added enough pyridine to bring the solution to pH about 5. To this was added a solution of 21.4 gm. (0.1 mole) 2,3-dibromopropionaldehyde in 100 cc. acetone, while adding pyridine as necessary to keep the mixture at pH 4-5, with cooling to keep the temperature in the solution at 30-40° C. As soon as no more pyridine was required to maintain the pH at 4-5, 20 gm. Hyflo was added, and a brown insoluble precipitate was filtered off and discarded. The filtrate was acidified with hydrochloric acid to pH 3-4, and a solution of iodine in potassium iodide and water was added until the reaction mixture gave a blue-black spot on starch-iodide test paper. There was an immediate precipitation of the light tan crystalline N-[(2-amino-4-hydroxy-6-pyrimido[4,5-b]pyrazyl)methyl]pyridinium iodide amounting to 8 gms. or 30% of theory.

*Example 5*

To a solution of 216 gms. (1 mole) 2,3-dibromopropionaldehyde in 500 cc. anhydrous ether cooled to —50° C. was added a solution at —50° C. of 73 gm. (1 mole) diethylamine in 500 cc. anhydrous ether with cooling to keep the temperature at —30° to —40° C. The slurry of white solid in ether was allowed to stand for an hour, during which time the temperature rose to +10° C. There was added 100 cc. water to dissolve the product, and the ether layer was discarded.

The water solution was added to 100 gm. (0.47 mole) 2,4,5-triamino-6-hydroxypyrimidine dihydrochloride suspended in 300 cc. water. Sodium hydroxide (5N) was added to bring the pH to about 3, and 100 cc. solution containing 20 gm. iodine and 40 gms. potassium was added.

Concentrated sulfuric acid to pH 1-2 was added and the solution cooled to 30° C. The unreacted 2,4,5-triamino-6-hydroxypyrimidium sulfate was removed.

On neutralization of the filtrate to pH 7 and cooling to 5° C. there was obtained a brown precipitate which was filtered off. This filter cake was extracted with 3–500 cc. portions of hot 10% acetic acid, and the solutions treated with 50 gm. portions of potassium iodide, cooled, and filtered.

After two re-crystallizations of the material from 10% potassium iodide solution there was obtained bright yellow crystals of 2-amino-4-hydroxy-6-(diethylaminomethyl) pyrimido [4,5-b] pyrazine hydriodide).

A sample slurried in water and treated with sodium hydroxide to pH 8–8.5 gave a light-tan product, the analysis of which agreed well for that of 2 - amino - 4 - hydroxy-6-(diethylaminomethyl) pyrimido [4,5-b] pyrazine having the structural formula

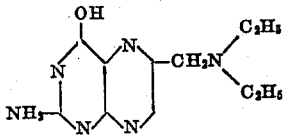

These compounds show no definite melting point, but decompose around 300° C.

Oxidation of the 2-amino-4-hydroxy-6-(diethylaminomethyl) pyrimido [4,5-b] pyrazine in alkaline permanganate after removal of manganese dioxide and acidification gives 2-amino-4-hydroxy-6-carboxypyrimidine [4,5-b] pyrazine as shown by study of its ultraviolet absorption spectra.

I claim:
1. Compounds having the general formula:

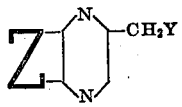

in which

is a pyrimidine radical and Y is a radical of the group consisting of those of tertiary amines and quaternary ammonium compounds.

2. Compounds having the general formula:

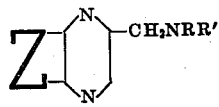

in which

is a pyrimidine radical and —NRR′ is the radical of a tertiary amine.

3. Compounds having the general formula:

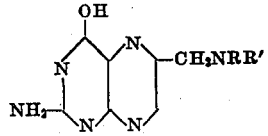

in which R and R′ are alkyl radicals.

4. 2-amino-4-hydroxy-6-(diethylaminomethyl) pyrimido [4,5-b] pyrazine.

5. Compounds having the general formula:

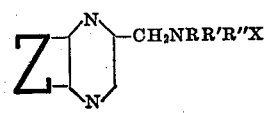

in which

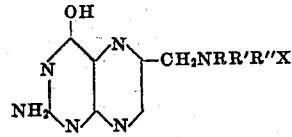

is a pyrimidine radical and —NRR′R″X is the radical of a quaternary ammonium compound.

6. Compounds having the general formula:

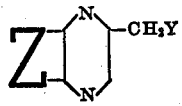

in which the group —NRR′R″X represents the radical of a quaternary ammonium compound.

7. N -(2-amino-4-hydroxy-6-pyrimido [4,5-b] pyrazyl) methyl pyridinium iodide.

8. A method of preparing compounds having the general formula:

in which

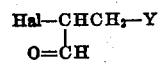

is a pyrimidine radical and Y is a radical of the group consisting of those of tertiary amines and quaternary ammonium compounds which comprises mixing together an vicinal diamino pyrimidine and a compound having the formula $$\text{Hal}-\text{CHCH}_2-\text{Y}$$
$$\quad\quad\quad\quad\text{O}=\text{CH}$$

in which Hal represents a halogen and Y is as defined above and thereafter recovering the said product.

9. A method of preparing compounds having the general formula:

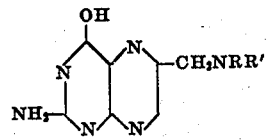

in which R and R′ are alkyl radicals, which comprises mixing together 2,4,5-triamino-6-hydroxy pyrimidine and a compound having the formula $$\text{Hal}-\text{CHCH}_2-\text{NRR}'$$
$$\quad\quad\quad\quad\text{O}=\text{CH}$$

in which Hal represents a halogen and R and R′ are as defined above and thereafter recovering the said product.

10. A method of preparing compounds having the general formula:

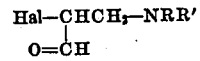

in which the group —NRR′R″X represents the radical of a quaternary ammonium compound which comprises mixing together 2,4,5-triamino-6-hydroxy pyrimidine and a quaternary ammonium compound having the formula $$\text{Hal}-\text{CHCH}_2-\text{NRR}'\text{R}''\text{X}$$
$$\quad\quad\quad\quad\text{O}=\text{CH}$$

in which Hal represents a halogen and —NRR′R″X is as defined above and thereafter recovering the said product.

11. A process of preparing N-(2-amino-4-hydroxy-6-pyrimido [4,5-b] pyrazyl) methyl pyridinium halide which comprises mixing together the reaction product of a 2,3-dihalopropionaldehyde and pyridine with 2,4,5-triamino-6-hydroxypyrimidine and thereafter recovering the said product.

12. A method of preparing N-[(2-amino-4-hydroxy-6-pyrimido [4,5-b] pyrazyl) methyl] pyridinium iodide which comprises mixing together 2,4,5-triamino-6-hydroxypyrimidine with a compound having the formula:

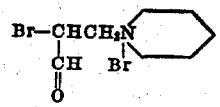

allowing the mixture to react at a temperature not in excess of about 70° C. while maintaining the hydrogen ion concentration between about pH 3 and pH 5, adding iodine to the reaction mixture and thereafter recovering the said product.

MARTIN E. HULTQUIST.

No references cited.